United States Patent
Wedge et al.

(10) Patent No.: US 6,719,825 B2
(45) Date of Patent: Apr. 13, 2004

(54) AIR DRYING APPARATUS AND METHOD

(75) Inventors: Leonard Wedge, Roanoke, VA (US); Niteen Patel, Roanoke, VA (US)

(73) Assignee: Graham-White Manufacturing Company, Salem, VA (US)

(*) Notice: Subject to any disclaimer, the term of this patent is extended or adjusted under 35 U.S.C. 154(b) by 0 days.

(21) Appl. No.: 10/140,759

(22) Filed: May 7, 2002

(65) Prior Publication Data

US 2003/0209141 A1 Nov. 13, 2003

(51) Int. Cl.[7] .......................... B01D 53/22; B01D 53/26
(52) U.S. Cl. .......................... 95/52; 95/22; 95/45; 96/4; 96/8
(58) Field of Search .......................... 95/22, 45, 47–55; 96/4, 7–10

(56) References Cited

U.S. PATENT DOCUMENTS

| | | | |
|---|---|---|---|
| 4,670,145 A | * 6/1987 | Edwards | 210/321.87 |
| 4,718,921 A | * 1/1988 | Makino et al. | 95/52 |
| 4,787,919 A | * 11/1988 | Campbell et al. | 95/39 |
| 4,808,199 A | * 2/1989 | Yearout | 95/49 |
| 4,857,082 A | * 8/1989 | DiMartino et al. | 95/19 |
| 4,881,953 A | * 11/1989 | Prasad et al. | 95/41 |
| 4,944,776 A | * 7/1990 | Keyser et al. | 95/10 |
| 4,961,759 A | * 10/1990 | Taylor | 95/52 |
| 5,034,125 A | * 7/1991 | Karbachsch et al. | 210/321.8 |
| 5,131,929 A | * 7/1992 | Brockmann et al. | 95/52 |
| 5,160,514 A | * 11/1992 | Newbold et al. | 96/8 |
| 5,169,412 A | 12/1992 | Prasad et al. | |
| 5,205,842 A | 4/1993 | Prasad | |
| 5,226,932 A | 7/1993 | Prasad | |
| 5,259,869 A | * 11/1993 | Auvil et al. | 95/52 |
| 5,282,964 A | * 2/1994 | Young et al. | 210/321.8 |
| 5,290,341 A | * 3/1994 | Barbe | 95/54 |
| 5,375,620 A | 12/1994 | Ginder, Jr. | |
| 5,388,413 A | * 2/1995 | Major et al. | 62/640 |
| 5,429,662 A | * 7/1995 | Fillet | 95/14 |
| 5,470,379 A | * 11/1995 | Garrett | 96/4 |
| 5,605,564 A | * 2/1997 | Collins | 95/52 |
| 5,632,805 A | 5/1997 | Woodard | |
| 5,641,337 A | * 6/1997 | Arrowsmith et al. | 95/39 |
| 5,829,272 A | * 11/1998 | Barry | 62/655 |
| 5,885,329 A | * 3/1999 | Hermann | 95/22 |
| 5,961,692 A | * 10/1999 | Collins | 95/45 |
| 6,004,383 A | 12/1999 | Kuhnelt | |
| 6,070,339 A | 6/2000 | Cunkelman | |
| 6,126,724 A | 10/2000 | Martin et al. | |
| 6,128,825 A | 10/2000 | Cunkelman | |
| 6,180,168 B1 | 1/2001 | Stookey et al. | |
| 6,296,683 B1 | * 10/2001 | Koch | 95/23 |
| 6,315,814 B1 | * 11/2001 | Barry et al. | 95/24 |

* cited by examiner

Primary Examiner—Robert H. Spitzer
(74) Attorney, Agent, or Firm—Dority & Manning, P.A.

(57) ABSTRACT

Apparatus and methods are disclosed for using membranes to reduce the relative humidity of a compressed air stream. Air dryers employing membranes consist of a permeable membrane capable of blocking the passage of nitrogen and oxygen molecules, but allowing water vapor molecules to pass through. A membrane filter may be adapted to receive process flow of contaminated air. A sweep chamber may be positioned adjacent to filtration media to pass a portion of dried air back into contact with a portion of the membrane. A flow metering device may be positioned downstream from the membrane filter to adjust a portion of the air process flow as sweep air. The amount of process flow air diverted as sweep air may be proportional to the pressure and flow of the process flow. In some applications, an optional minimum pressure valve may be employed downstream of the sweep chamber to maintain a minimum threshold pressure of process air flow.

31 Claims, 12 Drawing Sheets

AIR DRYING APPARATUS AND METHOD

FIELD OF THE INVENTION

The invention is directed to air drying apparatus and methods, including air drying apparatus designed for use in transit vehicles, locomotives, trucks and other similar vehicles or mechanical apparatus employing compressed air systems.

BACKGROUND OF THE INVENTION

Trucks, buses, locomotives, transit vehicles and the like typically contain compressed air systems that operate brakes, automatic doors, horns, and the like. Air that emerges from air compressors in such systems often contains moisture and lubricating oil mist vaporized within the air. Such moisture and oil mist contaminants must be continuously removed from the compressed gas handling system to prevent failure of the system due to build-up of water or sludge in compressed air lines and air operated equipment.

Air dryers may be used to reduce water vapor content of the air which will further reduce the likelihood of liquid water condensing in the air lines and equipment downstream of the air dryer. One problem with such air dryers is that particulate material or soot may clog the filters of such dryers, which sometimes causes the filters to malfunction. When a filter breaks, unfiltered contaminated gas undesirably may seep through the break, preventing the dryer from operating effectively.

Dessicant dryers commonly used to process onboard compressed air on locomotives often have proved inadequate. Dessicant towers usually require a relatively large canister of dessicant material to perform well. In locomotive applications, the peak compressed air demand of a train often exceeds the air processing capability of the most commonly available tower-type dessicant dryers.

Membrane-type dryers are known for reducing the relative humidity of compressed air streams, as shown in U.S. Pat. No. 6,126,724 to Martin et al (the "Martin patent"). The apparatus disclosed in the Martin patent employs membranes that selectively block nitrogen and oxygen passage, but allow gaseous water (i.e. water vapor) molecules to pass through and be discarded. In general, the efficiency of water vapor removal using membrane drying systems is dramatically improved when higher flow pressures are used. The mass transfer driving force is the difference in partial pressures of water vapor on each side of the membrane.

Membrane dryers are susceptible to fouling if excess amounts of oils, soot, liquid water, or other contaminants become lodged in the relatively sensitive membrane material. One problem in using membranes for drying applications is that contaminants may become undesirably lodged in the membrane, reducing or eliminating the ability of such membranes to perform gaseous separations.

Sweep air is required for the operation of such membrane drying systems. In general, the greater the difference in water vapor partial pressure across a membrane, the more efficient the transfer of undesirable water vapor out of the system. Sometimes air which has already been cleaned and dried is released downstream of the membrane through an orifice. This dried air may be used as "sweep air" to flow back across or along the membrane. This sweep air may serve to provide a favorable partial pressure for efficient drying operations. Usually, this sweep air is at or close to atmospheric pressure.

Because sweep air usually approximates atmospheric pressure, the level of flow through such a downstream orifice may be undesirably dictated by the upstream pressure level. That is, at process pressures below about 30 psia, the flow through the orifice may vary as a function of pressure. Conversely, at pressures above about 30 psia, the flow may become constant regardless of the amount of process pressure applied. This sometimes results in a drying apparatus or system that, when operated at flows below nominal, uses greater amounts of sweep air than necessary. At flows above nominal, the amount of sweep air used may be a much smaller percentage of total process flow, resulting in less dew point depression accomplished by the air dryer. Thus, the amount of sweep air employed in systems using a downstream orifice may be undesirably dictated by the upstream process flow pressure.

In summary, it would be desirable to provide a system, apparatus and method for removing contaminants such as water vapor, oils, and the like from compressed air lines or sources effectively and efficiently. A method and apparatus for filtration that is capable of removing solid particulates, such as soot, and other contaminants such as entrained oil and water, without fouling or disabling membrane filters, would be highly desirable. Furthermore, a system that is capable of varying the amount of sweep air employed, as a function of the process flow and pressure, would be very desirable. And finally a method of treating the air with as high a process air pressure as possible would be highly desirable.

SUMMARY OF THE INVENTION

In the invention, a processing apparatus for removing contaminates from a process flow of air is provided. The apparatus may employ any number of membrane filters. One or more of such membrane filters include a filtration media made up of a number of individual tubules, within the membrane filter being adapted to receive a process flow of contaminated air along a process flow pathway. The filtration media assists in separating from the process flow gaseous water vapor to dry the air within the process flow.

Some applications of the invention employ one or more pre-filtering stages or steps in which aerosol mist, oils, soot, liquids or other particulates may be removed from the air stream prior to the air stream reaching the membrane filter. However, such pre-filtering apparatus or steps are optional, and may not be included at all, depending upon the application.

Furthermore, the apparatus includes a sweep chamber, the sweep chamber being positioned adjacent the filtration with the sweep air flowing adjacent to the individual fiber tubules.

Optionally, a flow metering device may be positioned within the process flow pathway, and downstream from the membrane filter. The flow metering device may be adapted to divert a portion of the process air flow as sweep air into the sweep chamber. In the apparatus, the sweep air may be in flowing fluid communication with the filtration media, adjacent to the membrane filter.

In other applications of the invention, it may be desirable to provide an optional minimum pressure valve downstream of the sweep chamber. Such a minimum pressure valve (or regulator) could be configured to maintain a minimum threshold pressure of process flow, increasing the efficiency of the apparatus.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Figure 1:
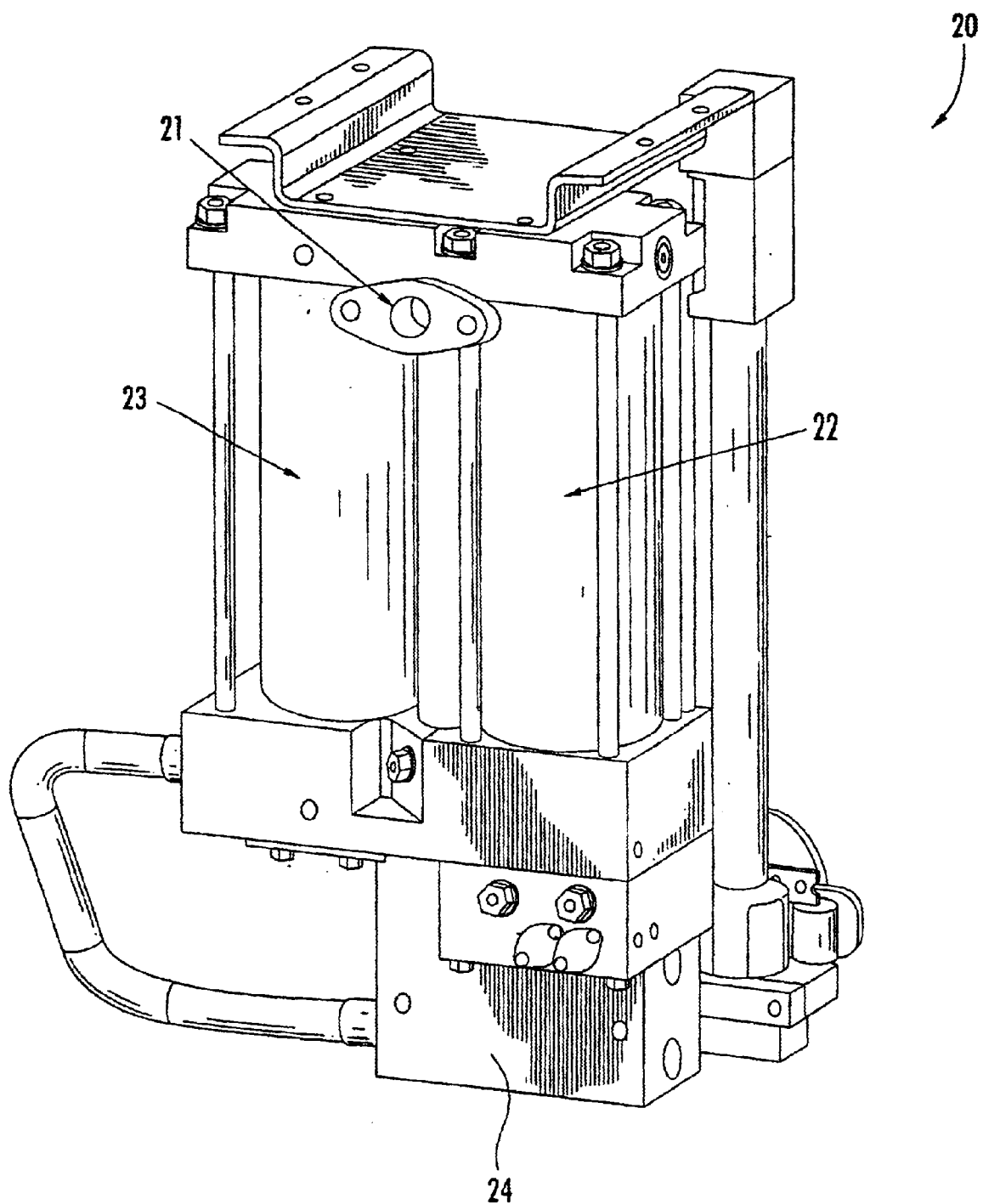
FIG. 1 is a perspective view of one embodiment of the dryer of the invention.

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

In general, membranes used for air drying are highly susceptible to contamination from liquid water and oil. For example, oil on membrane walls or filtration media may block the holes that allow gaseous water molecules to pass through. Because of this sensitivity, the air drying system or apparatus as provided in the invention may use, in addition to a membrane filter, a coalescing filter. The optional coalescing filter, if properly sized and applied, serves to remove liquid and aerosol oil and water from the process air stream. However, it should be noted that the coalescing filter is entirely optional in the practice of the invention.

In some applications of the invention, a bed of activated carbon or charcoal may be used upstream of the membrane filter for further protection from oil fouling the membrane filter. In one application, activated carbon or charcoal may be packaged and supplied in permeable bags, which are employed in the apparatus as further described below. In general, membrane air dryers depend upon a difference in partial pressures of the water vapor on each side of the membrane to create a mass transfer driving force. The greater the difference in partial pressures, the more efficient is the transfer.

In many cases, dry sweep air that is produced as a result of from the membrane filter of the invention may be vented to the atmosphere. The sweep air space or cavity is typically near atmospheric pressure (i.e., 14.7 psia). The efficiency of water vapor removal from a process flow air stream may be dramatically improved when the process air is dried at higher pressures.

In the invention, one application may provide the use of a valve in the air dryer system which is located downstream of the membrane to ensure that the process air pressure will be maintained at a relatively high level at all times that air is being applied or processed by the membrane. This valve may be referred to as a "minimum pressure valve". This minimum pressure valve may be designed to provide essentially any opening pressure, and may handle a variety of air flows. The use of such a "minimum" pressure valve is optional, and not required in all applications of the invention.

Membrane air drying systems consist of permeable membrane surfaces that are specially tuned to block nitrogen and oxygen molecules (i.e., air), but allow water vapor molecules to pass through. In many cases, the membrane is formed into bundles of thousands of very small fiber tubes or tubules. Wet filtered and compressed air may be routed down the central bore of such fibers in a membrane filtering apparatus, from one end of the dryer to the other. Water vapor may escape through the walls of the fiber to a sweep chamber, from which it is vented to atmosphere as a gas. In general, a fraction of the dried air, usually about 10–20% or more of the inlet process air flow, may be routed through a sweep chamber to continuously exhaust water vapor. The difference in the partial pressure of the water vapor in the wet air on one side of the membrane and the dry air on the other side of the membrane creates a driving force for the mass transfer of water molecules across the membrane surface.

In at least one application of the invention, a metering device, sometimes known as an "auto-purge" valve may be employed. For example, U.S. Pat. No. 5,375,620 to Ginder, Jr. et al. ("the Ginder patent") is directed to a self-adjusting flow metering device that is provided for regulating a secondary flow in volumetric proportion to a main flow from which the secondary flow is taken. As such, some applications of the invention may provide an opportunity to employ a flow metering device which may be similar to that described in the Ginder patent positioned downstream from the filtration media of a first membrane filter. A flow metering device may be adapted to divert a portion of the process flow as "sweep air" into a sweep chamber, in which the sweep air is in flowing fluid communication with the filtration media. In general, it is possible to employ essentially any flow restriction mechanism having any structure within the metering device that is adapted to regulate the amount of process flow that is diverted as sweep air. The invention is not limited to only those flow restriction mechanisms shown herein. In some cases, the amount of process flow air diverted as sweep air may be directly related or directly proportional to the flow of the process flow. It should be recognized, however, that such a metering device, or "purge valve", is an optional feature that may not be employed, depending upon the embodiment of the invention being applied in a given application.

In some applications, such a metering device or purge valve may vary the amount of sweep air as a function of the process air flow, so as to maintain a diversion ratio of process flow to sweep air that is more constant for the entire range of process flows. For example, in some applications, the percentage of air diverted is about 15–20% of the process air flow, regardless of the actual magnitude or level of the process flow. It may be desirable to employ a system that uses a sweep air volume that is optimized as compared to the amount of process flow. That is, the dew point depression of such an air dryer system may be nearly equal over the entire operating range of the process flow. Thus, a system that can provide a sweep air volume that is always proportional to total process air provides certain significant advantages.

A valve such as that shown in U.S. Pat. No. 5,375,620 could be used to employ a small amount of air even when there is no process air flowing through the system. Another option would be to provide or add another valve to stop all the sweep air when there is no process flow going through the air drying system. Such a valve could be controlled by an unloader signal from a compressor, or by a microprocessor controller using other data in the compressed air system as may often be available on a transit vehicle, truck, or locomotive.

In general, the invention may be provided in several embodiments. Some applications will benefit from the use of one or more pre-filtering stages. In at least one embodiment, a coalescing pre-filter may be used for removal of liquid and aerosol water and oil. In other applications, a pre-filter of activated carbon or charcoal may be provided for removal and elimination of any trace oil left in the process air stream, prior to the process air stream entering the membrane filter. A membrane tower (or towers) may be used for dew point depression of the compressed air stream.

Turning to FIG. 1, a perspective view of one embodiment of the invention is shown in which a dryer 20 is provided, that may be used on a truck, bus, locomotive, or other transit vehicle or apparatus. An inlet 21 provides an input location for air that is contaminated with water, entrained oils, and/or other contaminates. In the particular embodiment shown in FIG. 1, an optional coalescing pre-filter 22 is shown on the right side, and an optional carbon pre-filter assembly 23 is shown on the left side. The coalescing pre-filter 22 and the carbon pre-filter assembly 23 comprise what may be described as optional "pre-filtering means" or pre-filtering apparatus designed to remove large impurities such as soot, and particulate matter, and also liquid and aerosol water and oil. A membrane housing 24 is shown in the lower portion of FIG. 1.

With regard to the carbon pre-filter assembly 23, it should be recognized that many different types of carbon media could be employed, as further described herein. Activated charcoal is one type of carbon that may be used. In general, charcoal comprises an amorphous allotropic form of carbon. Examples of currently available carbon or charcoal products that could be employed are: granular activated carbon powder; bituminous coal-based pellets; coconut based granular materials; impregnated carbon; and BPL®4×10 (Calgon Corp.) and SG6 (Cameron Carbon Inc.).

Figure 1A:
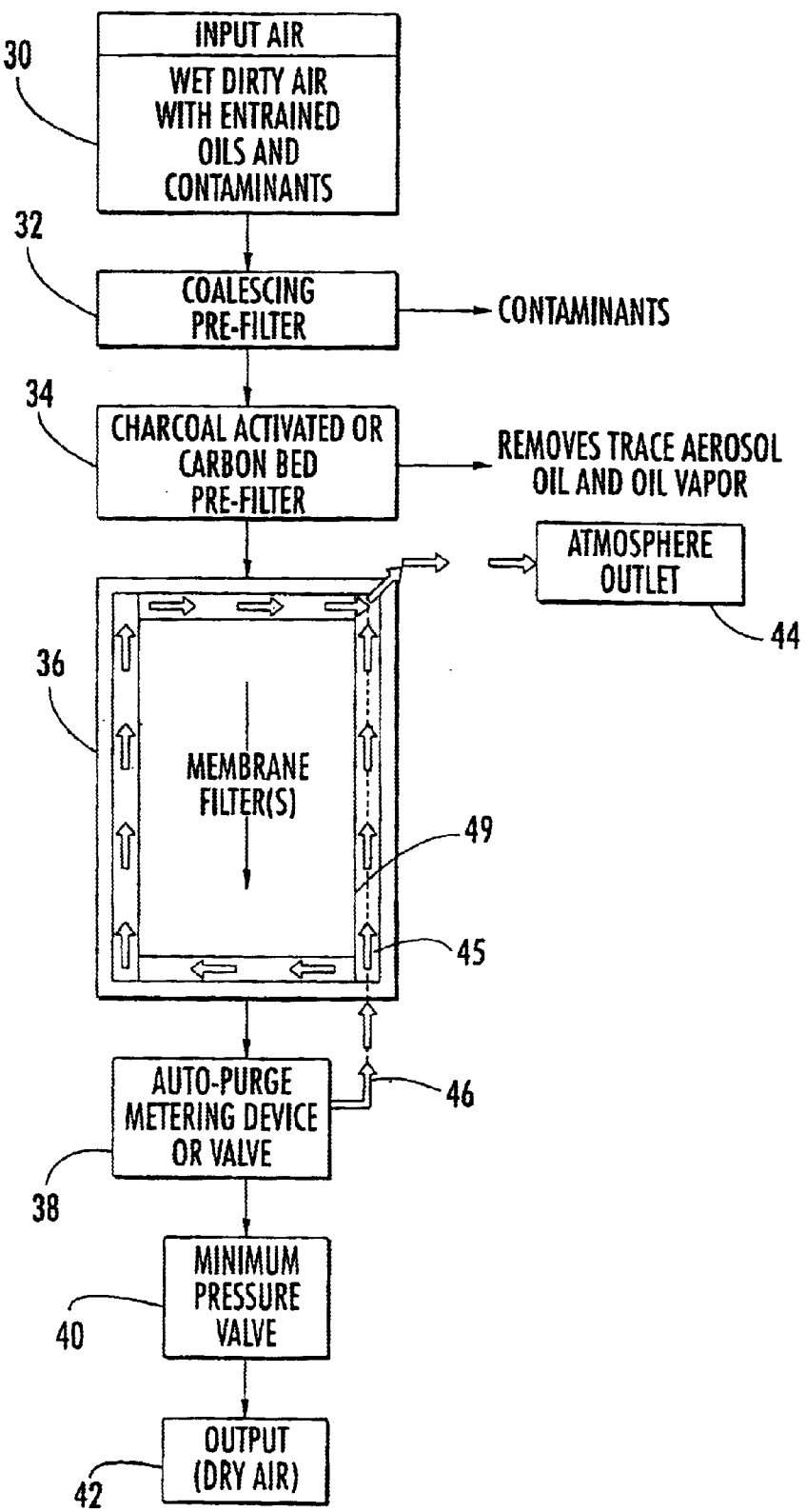
FIG. 1A shows a schematic diagram depicting the flow of air through the various subcomponents that may be employed in one particular application of the invention.

In FIG. 1A, an overview of yet another embodiment of the invention is provided, in which contaminated input air 30 proceeds into the system (as from a pneumatic reservoir or pneumatic line in a vehicle), and is filtered by optional coalescing pre-filter 32. The optional coalescing pre-filter 32 removes contaminates such as aerosol oil and water droplets, and also solid particulate contaminates from the process air stream. After pre-filtering at the coalescing pre-filter 32, the air may proceed to an optional carbon pre-filter assembly 34, which removes additional trace aerosol oil and oil vapor from the process air stream.

Once process air moves beyond the activated carbon pre-filter 34, it may move to membrane filter 36 as shown near the center of FIG. 1A. The membrane filter 36 may be a single unit, a dual unit, a triple unit, or may include any number of separate membrane filtration devices. Membrane filters commercially sold that may be used include, but are not limited to: DuraDry™ made by Parker/Balstrom Corp.; Stealth™ made by Porous Media Corp.; Cactus™ made by Permea Corp.; and MoistureVent™ made by Zeks Corp. The number of membrane filters 36 required in a given process will depend upon the cleanliness of the air that is required, and the processing conditions.

The cleaned ("dry") air proceeds out of one or more of the membrane filters 36, and then may be provided to an optional "auto-purge" metering device or valve 38. That is, in some applications of the invention, sweep air is diverted at the metering device or valve 38 as shown in FIG. 1A to return to membrane filter 36. This returned sweep air 46 may proceed along the outer circumferential periphery of the membrane filter 36, as further described herein. Furthermore, the sweep air may proceed along the sweep chamber 49, shown schematically in FIG. 1A, to an atmosphere outlet 44 where it is released. Water vapor is released to the atmosphere as well.

Another optional feature that may be employed in the practice of the invention is a minimum pressure valve 40, shown in FIG. 1A. The operation of the minimum pressure valve 40, is further discussed herein. Finally, output air 42 which has been cleaned and dried proceeds from the system, and back into pneumatic air lines or other compressed air reservoirs to a compressed system of a transit vehicle, locomotive, or other mechanical system.

In some applications, a metering device 38 may be employed, and in other applications a minimum pressure valve 40 may be employed. Some applications will use both a metering device 38 and a minimum pressure valve 40.

Figure 2A:
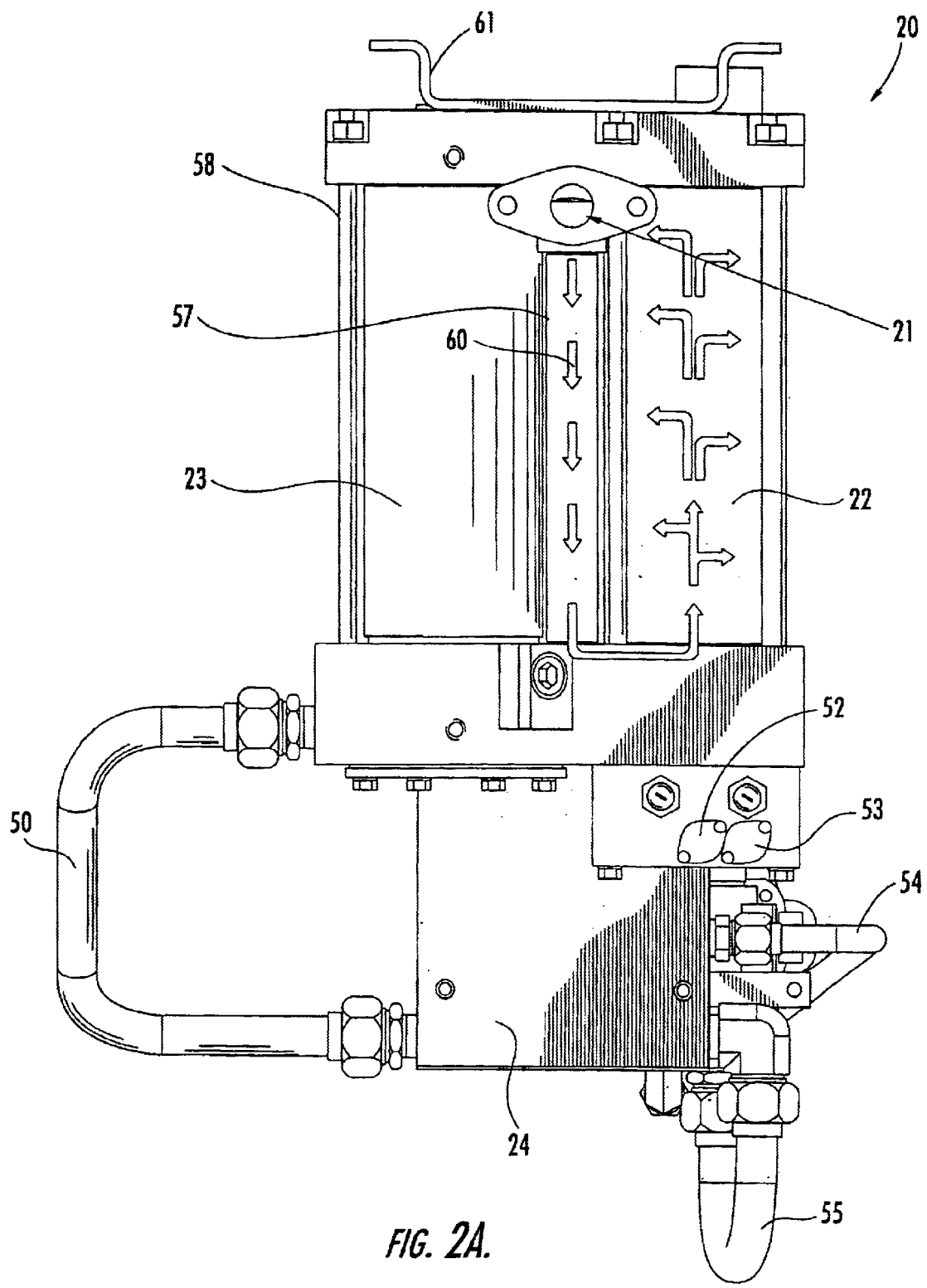
FIG. 2A shows a front view of one type of drying apparatus of the invention.

FIG. 2A shows a front view of the apparatus of FIG. 1, in which a more detailed description of the subcomponents is provided. As described, dirty or contaminated air from a compressed system enters inlet 21 and proceeds downward as shown on initial air pathway 60 within the outer surface 57 of the inlet tube to a point near the middle of FIG. 2A. There, the pathway turns, and proceeds upwards through optional coalescing pre-filter 22, and radiates outward through the filter media (filter media not shown in FIG. 2A). A continuation of the air process flow pathway will be shown in other Figures, described herein.

A housing 58 is shown on the left side of FIG. 2A, and a carbon filter assembly 23 is shown on the left upper portion of the dryer 20. At the lower portion of FIG. 2A, membrane housing 24 is shown which receives a connector tube 50, providing a pathway for process air to proceed from the carbon pre-filter assembly 23 to the membrane filter 36, which resides on the opposite side of dryer 20 (membrane filter 36 not shown in FIG. 2A).

A first drain valve 52 and second drain valve 53 are shown on dryer 20, and a sweep air tube 54 is shown near the right side of FIG. 2A. Tube 55 is located in the lower right portion of FIG. 2A and connects the dryer to the autopurge. The operation of these tubes and valves will be further discussed herein.

Figure 2B:
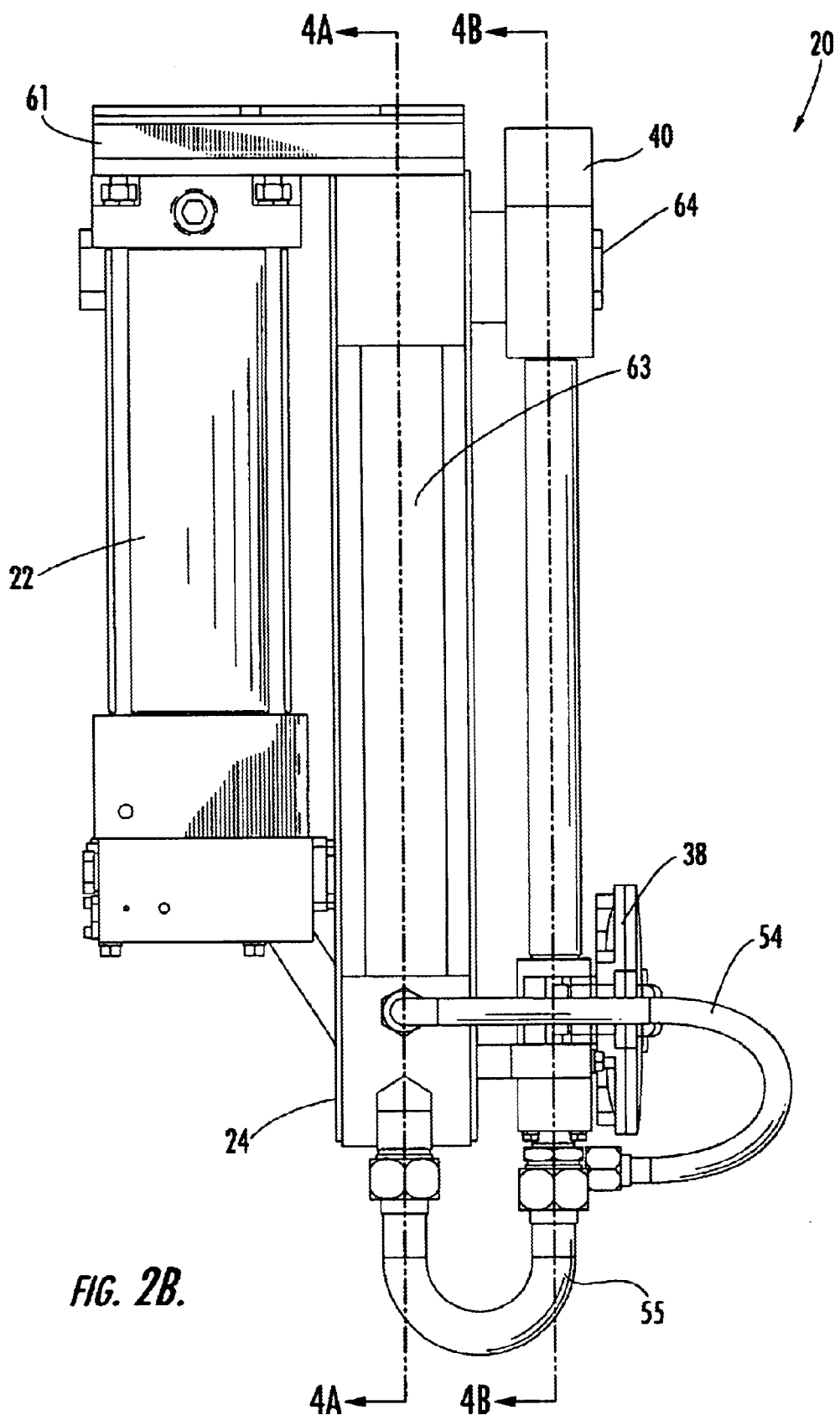
FIG. 2B shows a side view of the drying apparatus shown in FIG. 2A.

In FIG. 2B, a side view of the dryer 20 of FIG. 2A is shown. Cross-sectional lines 4A—4A and 4B—4B, are shown to reveal the lines through which the cross-sectional views seen in FIGS. 4A and 4B, respectively, are taken.

FIGS. 2A and 2B show a mounting bracket 61 on top of the coalescing filter 22. Like elements from previous Figures may be seen, and may be discussed herein with reference to only one Figure. A housing 58 is shown on the left side of FIG. 2B. Near the center of FIG. 2B, a membrane tower 63 is positioned. Towards the right side of FIG. 2B, the exterior of a minimum pressure valve 40 is shown, adjacent to an outlet 64, which provides an exit point for cleaned and dried air from the overall system. In the lower portion of FIG. 2B, an optional metering device or valve 38 may be seen. Furthermore, a sweep air tube 54 is shown, which passes air into the membrane tower 63, for further processing within the apparatus. A connecting tube 55 is shown near the bottom of FIG. 2B.

Figure 2C:
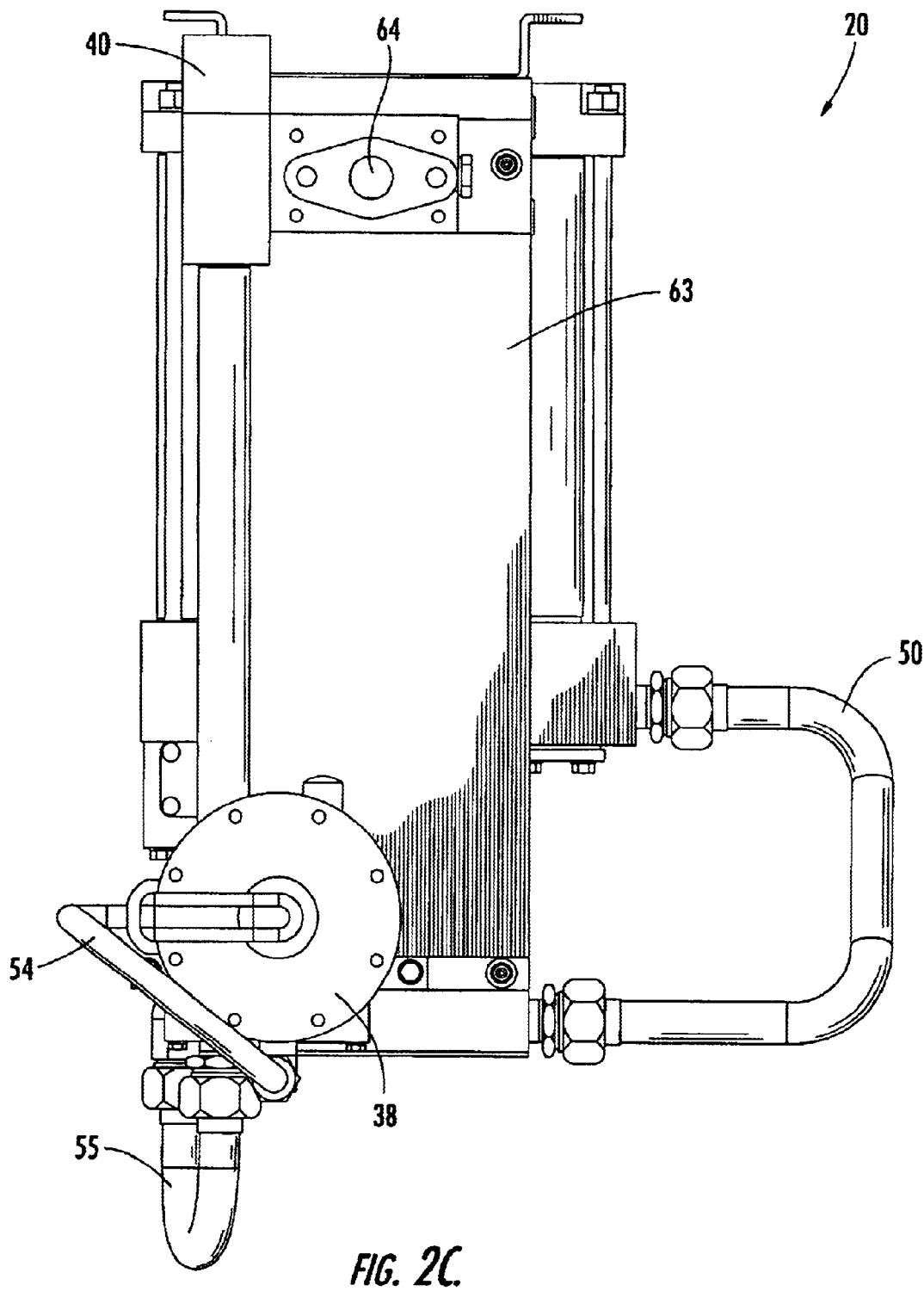
FIG. 2C shows a back view of the drying apparatus shown in FIGS. 2A–2B.

FIG. 2C shows a back view of the apparatus seen in FIGS. 2A–2B. In particular, the outlet 64 is located to the right of an optional minimum pressure valve 40. That is, not all embodiments of the invention employ a minimum pressure valve 40. A membrane tower 63 may be clearly seen on the back side of the dryer 20. Other like parts have been previously described with reference to FIGS. 2A and 2B.

Figure 3A:
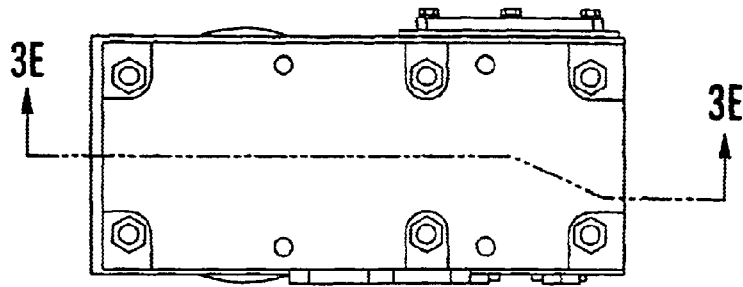
FIGS. 3A and 3B show a top view and a front view, respectively, of one type of filtration assembly that may be considered in one embodiment of the apparatus employed in the practice of the invention.
Figure 3B:
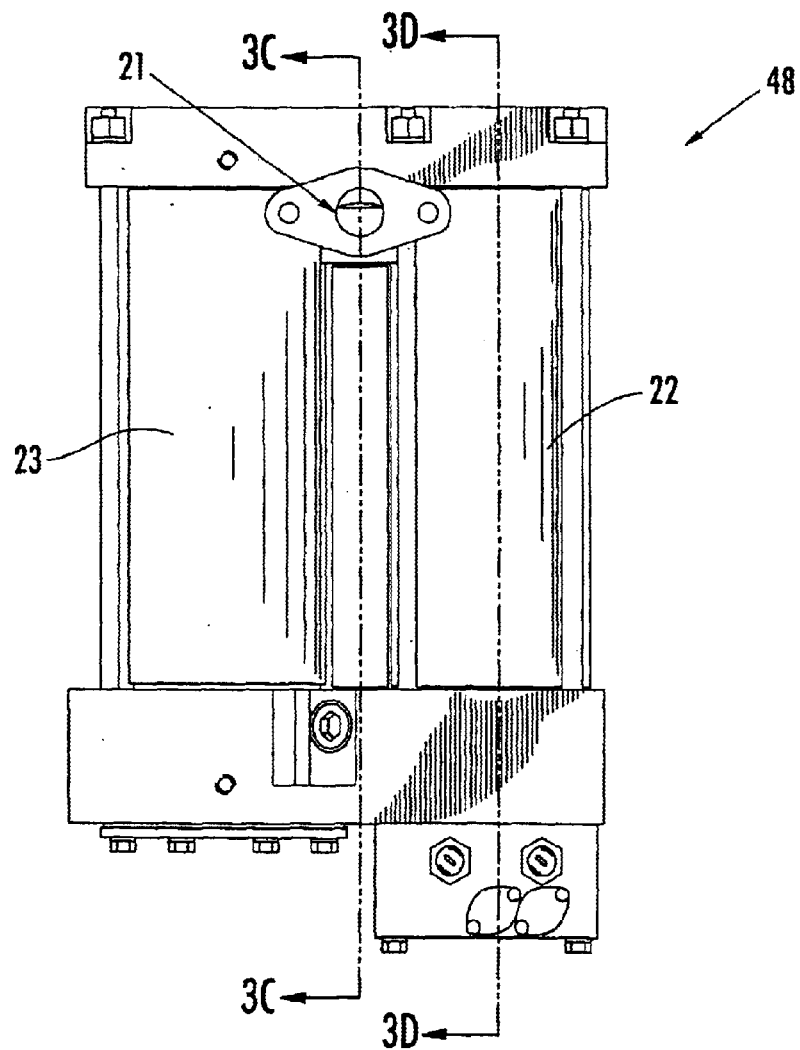

FIGS. 3A and 3B reveal a top view, and a front view, respectively, of a filtration assembly portion of dryer 20. That is, only the filtration assembly portion of the overall device is seen in FIGS. 3A–3E. Furthermore, FIG. 3A shows cross-sectional lines through the filtration assembly 48 comprising cross-sectional views 3E, and FIG. 3E.

Figure 3C:
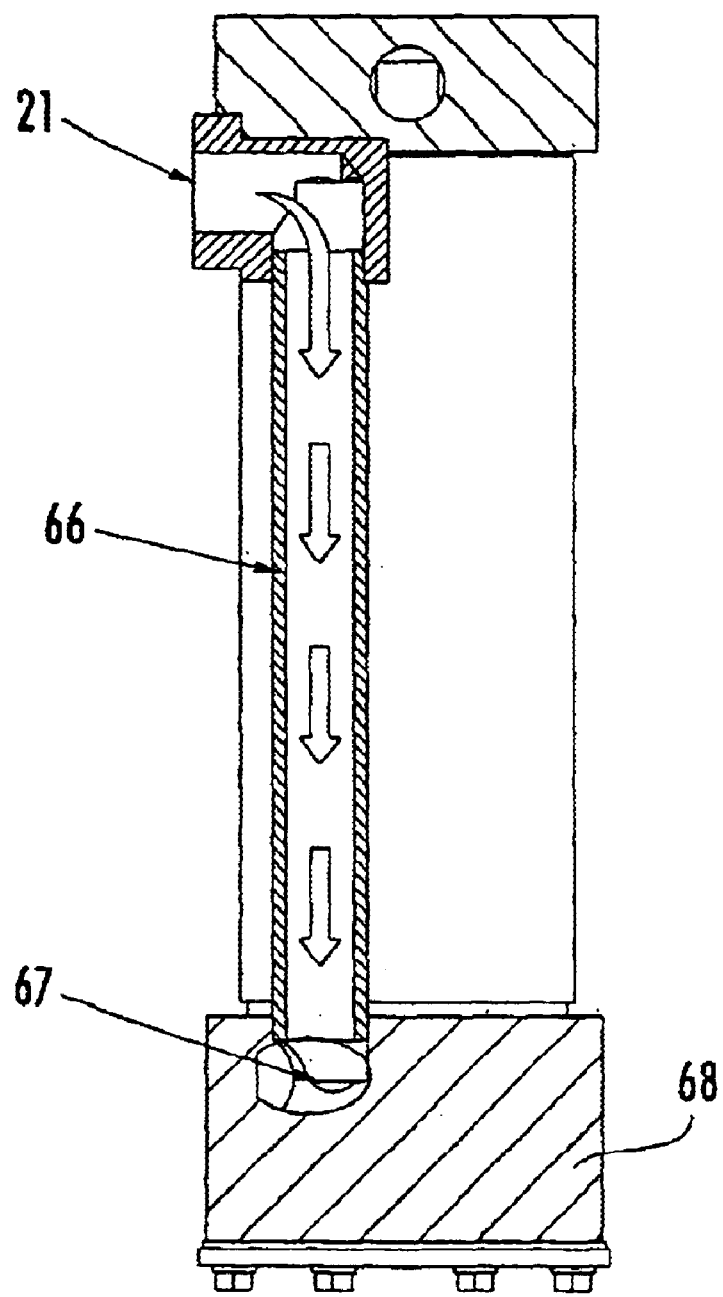
FIG. 3C shows a cross-sectional side view of the apparatus shown in FIG. 3B, taken along cross-sectional lines 3C—3C.
Figure 3D:
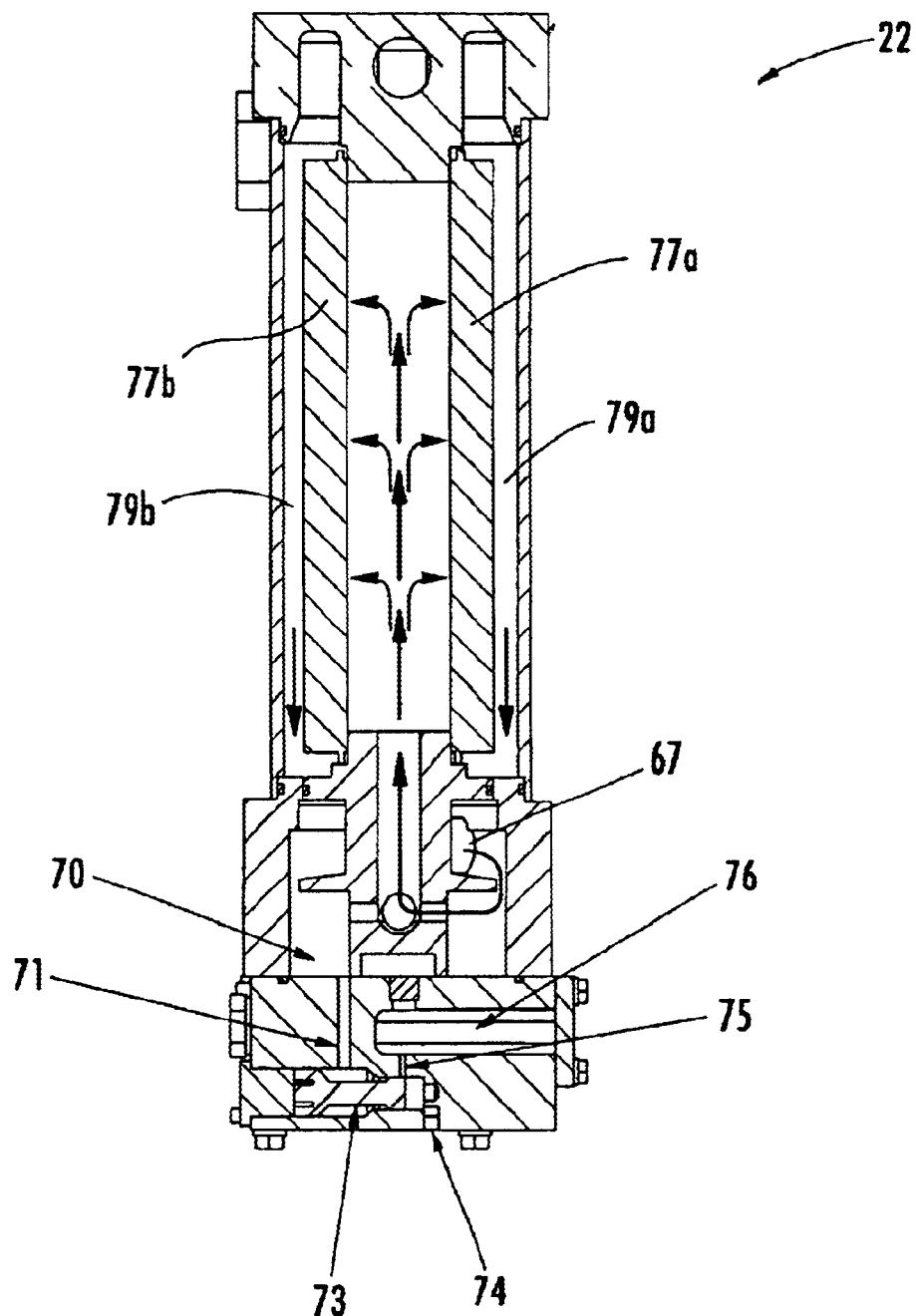
FIG. 3D shows a cross-sectional view of a filtration assembly as taken along cross-sectional line 3D—3D shown in FIG. 3B.

In FIG. 3B, lines 3C—3C and line 3D—3D show cross-sectional lines through which FIG. 3C and FIG. 3D, respectively, are taken. In FIG. 3B, inlet 21 is seen along the center line, with the coalescing pre-filter 22 and the carbon pre-filter assembly 23 on either side of the center line of the filtration assembly 48.

FIG. 3C shows a side cross-sectional view of the filtration assembly 48 as taken along line 3C—3C shown in FIG. 3A. The inlet 21 is shown, in which contaminated entrained air forms a process flow which proceeds downward along inlet tube 66 to an input chamber 67. A cross-section of the bottom manifold 68 is also seen in the lower part of FIG. 3C.

Turning to FIG. 3D, the process air moves from the inlet tube 66 of FIG. 3C into the coalescing pre-filter 22 through input chamber 67 shown in FIG. 3D. The process air flows around and upward as indicated by the arrows, and eventually moves out through filter media 77a–b to annular space 79a–b. A lower manifold sump 70 also is shown, in which liquids which have been mechanically separated from the process air stream are collected before moving through port 71 into a bore in the drain. Periodically, an air pilot signal may be directed to the drain valve spool 73 which may serve to shift the drain valve spool 73 to the right. When this occurs, this may allow liquids collected in the sump 70 to flow through the port 75 into the sump 76. When the pilot signal is removed, the first drain valve spool 73 will shift back to the left due to air pressure, to the position shown in FIG. 3D, and the liquids in the sump 76 may be expelled through port 75, and through exhaust port 74. In this way, water or oil droplets or mist may be removed from the process air flow prior to the membrane filter.

Figure 3E:
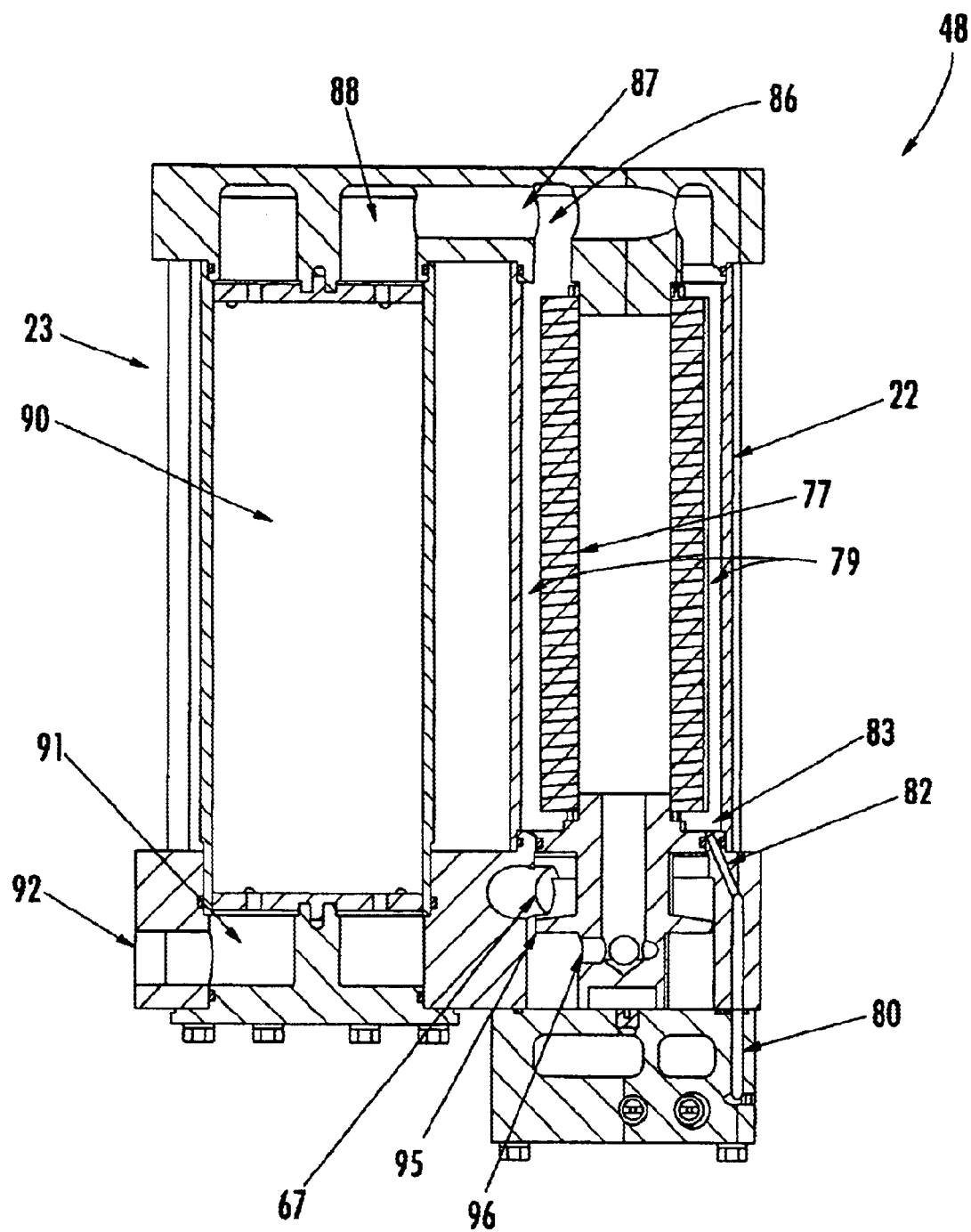
FIG. 3E shows another cross-sectional view of one embodiment of the apparatus of the filtration assembly taken along line 3E—3E as shown in FIG. 3A.

FIG. 3E shows an additional cross-sectional view of a pre-filtration assembly 48 along the lines shown in 3E—3E of FIG. 3A. In FIG. 3E, the pre-filtration assembly 48 provides an air process flow from input chamber 67 by the flange portion of retainer 95 and into retainer 95 at the point shown at the lower portion 96 of the retainer 95. Air process flow continues through the center of the retainer 95, into the filter media 77 of the coalescing filter 22. The process air then flows up to the upper manifold chamber 86 and through the bore 87 into the superior chamber 88. Liquids that the coalescing filter 22 collects drain down through space 79 to water collection point 83. This liquid may continue to drain to the drain valve assembly through upper port 82 and lower port 80. Coalesced liquids that have collected are discharged to atmosphere through drain valve 53 in a manner similar to that described for the liquids removed through mechanical separation through drain valve 52 (see FIG. 2A).

Process air proceeds to the superior chamber 88. Then process air flows downward into the carbon pre-filtering assembly 23 through the carbon filter media 90 downward to the inferior chamber 91, and out of the pre-filtration assembly 48 through process flow air exit 92.

It should be recognized that the pre-filtering by way of a coalescer or carbon or charcoal unit, or other like assembly, is an optional feature of the invention, and will not be necessary in all applications. For example, a coalescing pre-filter 22 may not be required in all applications. Furthermore, a carbon pre-filter assembly 23 is also optional.

Figure 4A:
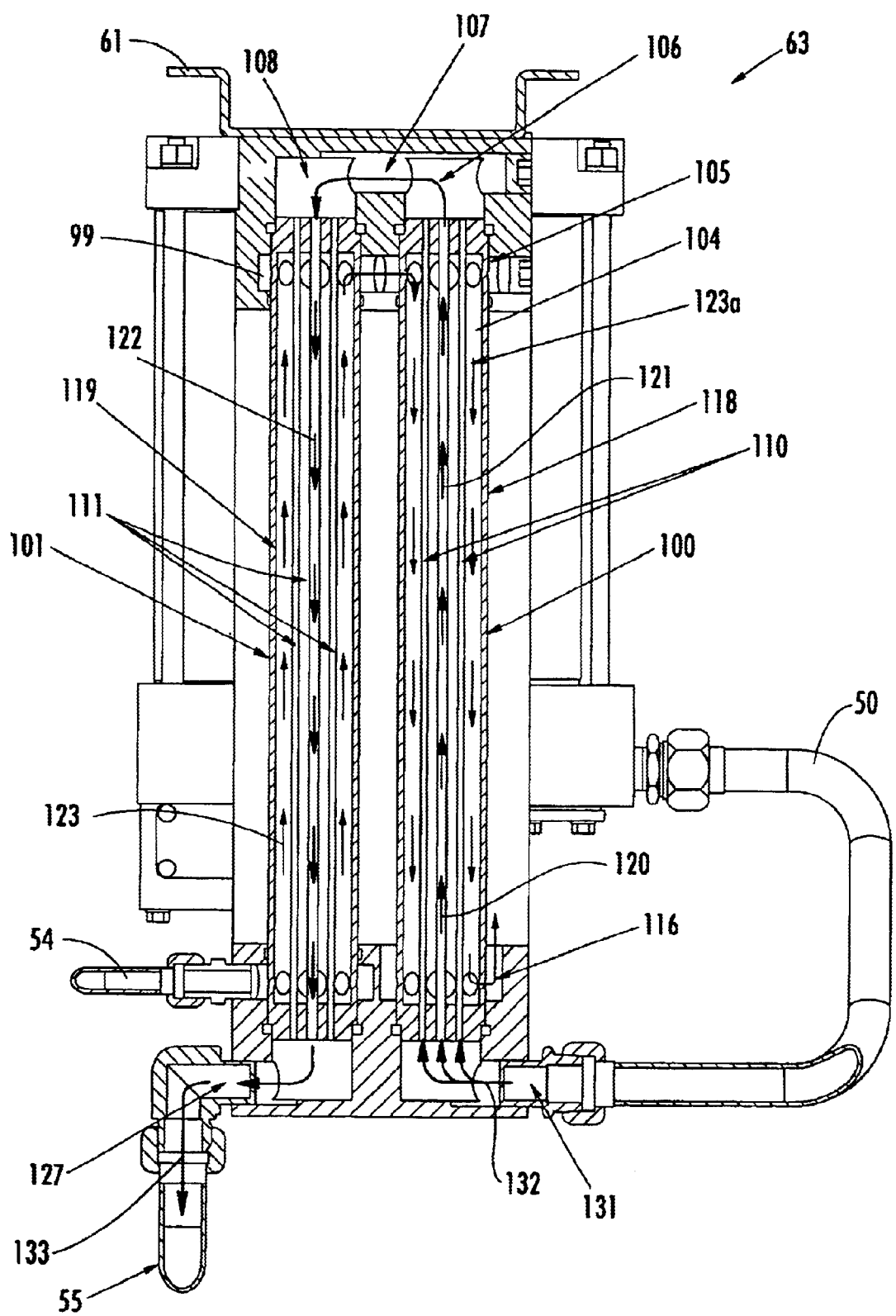
FIG. 4A shows a cross-sectional view along the lines shown in FIG. 2B as 4A—4A.

Once air emerges from the process flow air exit 92, it proceeds through connector tube 50 to the membrane towers 63 as shown in FIG. 4A in cross-section. Process air flows past entry point 131, and is shown as process flow input arrow 132 at the lower portion of FIG. 4A. In FIG. 4A, a first membrane tower 100 is positioned on the right side, and a second membrane tower 101 is positioned on the left side. The embodiment shown in FIG. 4A uses two membrane units or towers, but other embodiments of the invention could use one, three, four, or more membrane filtering units. The first membrane tube 118 and the second membrane tube 119 form the outer position of each membrane tower of the membrane towers 63.

Upward moving process air 120 proceeds through the first filtration media 110, as also seen at upward moving process flow arrow 121. The first and second filtration media 110–111 are represented in the drawing as being comprised of 3 individual tubules each for illustrative purposes, but in fact each filtration media contains a vast number of tubules as previously described. Process air enters the first superior chamber 106, passes through bore 107, and into the second superior chamber 108. The process air then flows down through the center of the second filtration media 111 downward along moving process flow arrow 122 and further into process flow exit pathway 133. The process air flows through outlet 127 through the connecting tube 55, shown at the left lower portion of 4A. Then, the process air flows to the assembly 126, as further shown and described in connection with FIG. 4B.

An optional flow restriction mechanism may be used in the assembly 126 which, in some instances, comprises a variable flow orifice. See FIG. 4B. Such a flow restriction mechanism may be similar to that disclosed and described in U.S. Pat. No. 5,375,620, the disclosure of which is hereby incorporated by reference. The flow restriction mechanism of the assembly 126 may be configured to regulate the amount of the process flow air diverted as sweep air, wherein the amount of process flow diverted as sweep air is directly related to the flow and pressure of the process air flow.

In some applications, the assembly 126 (also sometimes known as a flow restriction mechanism) may comprise self-adjusting flow metering device that is adapted to divert a certain percentage or proportion of the process flow air which has been cleaned by a membrane filtration assembly 63 to form a sweep air supply. The purpose and function of the sweep air will be discussed herein, but in general the sweep air is a requirement for operation of the membrane towers 63.

As will be discussed in detail in the description, the self-adjusting flow metering device that may be used with the present invention may consist of a self-contained device which provides an adequate but not excessive volume of purge gas to be used for regeneration of an idle adsorption chamber. The present invention controls the volume of purge gas in proportion to the volume or the pressure of compressed gas being dehydrated.

The present invention, in one particular embodiment, utilizes a metering tube having a flow-sensing orifice or venturi which causes a drop in pressure of the gas flowing through the metering tube. A purge flow port may branch off from the metering tube prior to the sensing orifice and feed to a diaphragm. This valve may be of many different types, including of a type similar to that shown in U.S. Pat. No. 5,375,620. However, it should be recognized that flow regulation mechanisms and means different from that shown in U.S. Pat. No. 5,375,620 also may be employed in the practice of the invention.

Figure 4B:
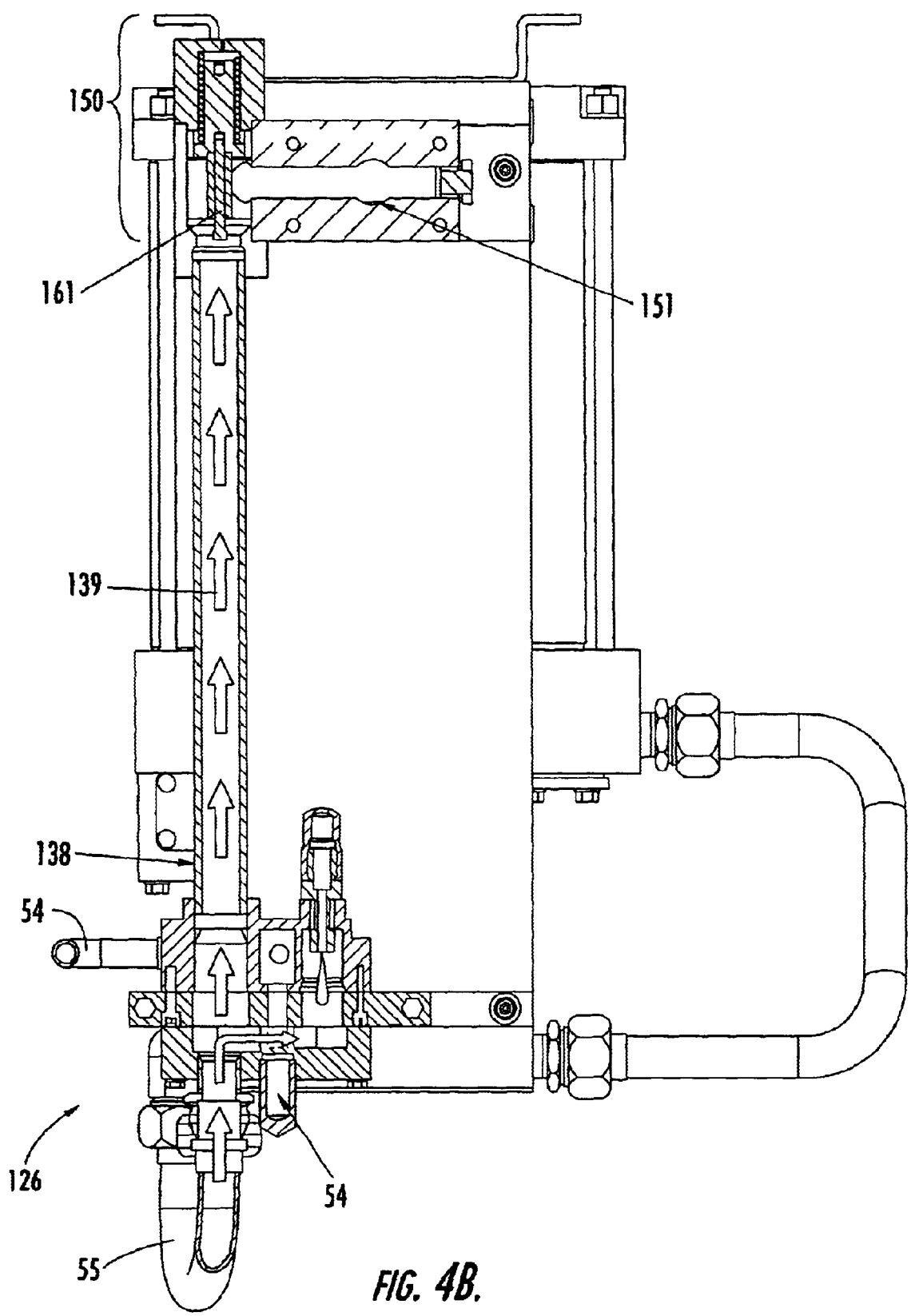
FIG. 4B shows a further cross-sectional view as shown in FIG. 2B along line 4B—4B of FIG. 2B.

In FIG. 4B, a portion of sweep air is directed through the assembly 126, and out to membrane subassembly through sweep air tube 54. The main portion of the process air flows up through the center of the outlet tube 138, as shown by the arrows pointing upwards in FIG. 4B. This process air flow along arrow 139 proceeds upwards to an optional minimum pressure valve 150 (also known as a back pressure regulator). When the process air flow pressure is above a predetermined level (about 75 psi, for example), the minimum pressure valve 150 may be designed to open, thereby allowing process air to proceed beyond poppet 161 to the port 151.

The diversion of a certain percentage of the dry cleaned air (i.e. sweep air) that proceeds into the assembly 126 flows through the sweep air tube 54 and enters the membrane.

Sweep air, once separated from the process air flow, flows back across the surface of the second filtration media 111, followed by first filtration media 110. As shown in FIG. 4A, sweep air enters the first sweep chamber near arrow 123 and flows upwards along the outside of the second filtration media 111 and then the first filtration media 110, respectively. Arrows in FIG. 4A show the movement of air upwards on the outer periphery of the second filtration media 111 continuing to upper chamber 99 above the second membrane tower 101 and to bore 105 above first membrane tower 100. The sweep air flows downward in first membrane tower 100 through first sweep air chamber 104, along arrow 123a. The sweep air passes over the second and then the first filtration media 111–110 which is comprised of a vast number of individual membrane tubules. It is across the walls of the individual tubules that the actual passage of gaseous water vapor from the process air on the inside of the tubules to the sweep air on the outside of the tubules occurs. The bore 116 exhausts remaining sweep air to the atmosphere.

Figure 4C:
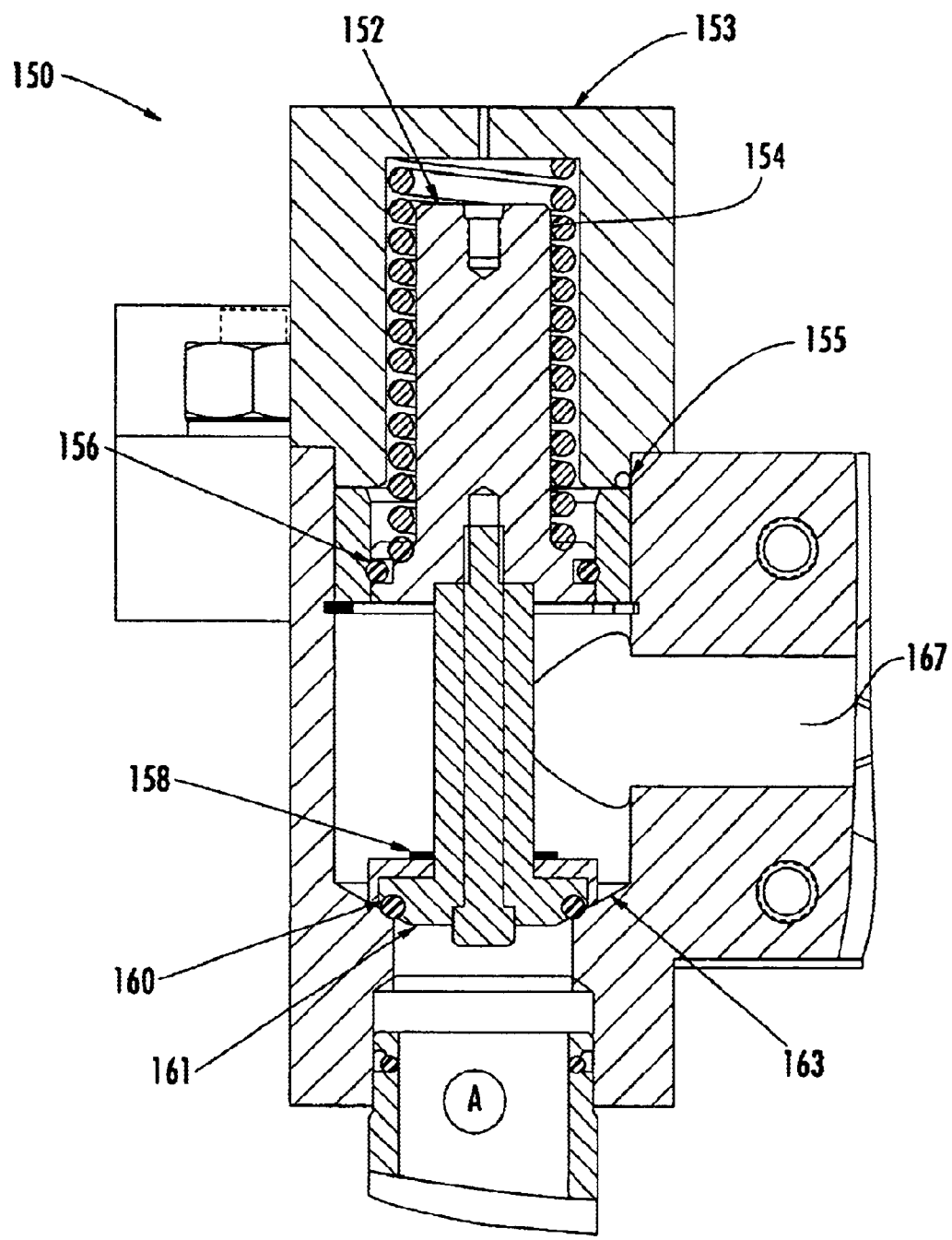
FIG. 4C shows a view of one type of minimum pressure valve that optionally may be employed in one embodiment of the invention.

FIG. 4C shows a detailed view of one optional device that may be used in one application of the invention. This device is a minimum pressure valve 150, also seen in FIG. 4B. The minimum pressure valve 150 may be designed to employ any predetermined opening pressure, and to handle a variety of different types of air flow. In most applications, the use of a minimum pressure valve 150 may be downstream of one or more membranes to ensure that the process air pressure will be maintained at a high level at all times, when air is being processed by the membrane.

An optional minimum pressure valve 150 used in the application of the invention could be of many different mechanical types, so long as it serves the function of providing a threshold or minimum pressure level. In general, the pressure from the process flow builds until the force is large enough to overcome the retaining force from spring 154. See FIG. 4C. Poppet 161 shifts upward along with piston 152 as shown in FIG. 4C. When this occurs, the cap 153 continues to compress the spring 154. Then, the process air moves to chamber 167 when the poppet seal 160 is lifted from the seat 163. A retaining ring 158 is shown in FIG. 4C as well. Near the lower portion of the spring 154, a seal 155 and seal 156 are provided to provide a gaseous air tight seal to the minimum pressure valve 150.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A method of removing contaminants from an air process flow, comprising:
   (a) providing a contaminated air process flow as an input,
   (b) feeding the contaminated air process flow to a membrane filter, the membrane filter having a filtration media,
   (c) separating and removing contaminants from the contaminated air process flow to produce a partially cleaned air process flow,
   (d) providing a sweep chamber, adjacent to the filtration media,
   (e) feeding the air process flow through the filtration media thereby drying the air process flow, and
   (f) diverting a portion of the dried air process flow to the sweep chamber,
   wherein the amount of dried air process flow diverted to the sweep chamber is directly proportional to the air process flow and inversely proportional to the pressure of the air process flow.

2. The method of claim 1 comprising the additional step of pre-filtering the air process flow prior to feeding the contaminated air process flow to the a membrane filter.

3. The method of claim 2 comprising pre-filtering the air process flow using a coalescing filter.

4. The method of claim 2 comprising pre-filtering the air process flow using an activated carbon filter.

5. The method of claim 2 in which the pre-filtering is accomplished using more than one separate filtering device.

6. A method of removing contaminants from an air process flow, comprising:
   (a) providing a contaminated air process flow,
   (b) feeding the contaminated air process flow to a membrane filter, the membrane filter having a filtration media,
   (c) separating and removing contaminants from the contaminated air process flow to produce a partially cleaned air process flow,
   (d) providing a sweep chamber, adjacent to the filtration media,
   (e) feeding the air process flow through the filtration media, thereby producing a cleaned air process flow,
   (f) diverting a portion of the cleaned air process flow to the sweep chamber, and
   (g) regulating the minimum air pressure of the air process flow exiting the filtration media.

7. The method of claim 6 in which the regulation of the minimum air pressure of the air process flow is accomplished using a minimum pressure valve.

8. The method of claim 6 wherein the amount of cleaned air diverted from the cleaned air process flow to the sweep chamber is directly proportional to the air process flow and inversely proportional to the pressure of the air process flow.

9. The method of claim 8 in which the amount of cleaned air diverted is regulated by a metering device.

10. The method of claim 9 in which the air pressure of the air process flow is regulated by a minimum pressure valve, the minimum pressure valve being located downstream of the metering device.

11. The method of claim 6 in which the volume of sweep air provided is equal to from about 15 to about 20% of the volume of air process flow.

12. An air processing apparatus for removing contaminants from a process flow of air, comprising:
   (a) a first membrane filter, comprising a filtration media, and adapted to receive a process flow of contaminated air along a process flow pathway so as to separate gaseous water vapor from said air process flow,
   (b) a sweep chamber, adjacent to said filtration media,
   (c) a metering device in said process flow pathway and downstream from said first membrane filter, the metering device adapted to divert a portion of said air process flow as sweep air into said sweep chamber, wherein said sweep air is in flowing fluid communication with said filtration media, and
   (d) a flow restriction mechanism within said metering device and adapted to regulate the amount of said sweep air diverted into said sweep chamber directly proportional to said air the process flow and inversely proportional to the pressure of said air process flow.

13. The apparatus of claim 12 in which the amount of said sweep air is directly proportional to the volume of said air process flow.

14. The apparatus of claim 12 wherein the gaseous water vapor may be separated from said process flow pathway by migration of the gaseous water vapor across said filtration media, from a first side of said filtration media to a second side of said filtration media.

15. The apparatus of claim 14 wherein the gaseous water vapor emerging from said second side of said filtration media is carried by said sweep air to the atmosphere.

16. The apparatus of claim 12 additionally comprising:
   (e) a minimum pressure valve in said process flow pathway downstream from said first membrane filter.

17. The apparatus of claim 12 in which a second membrane filter is employed in said process flow pathway upstream of said first membrane filter.

18. An air processing apparatus for removing contaminants from a process flow of air, comprising:
   (a) a first membrane filter, comprising a filtration media and adapted to receive a process flow of contaminated air along a process flow pathway so as to separate gaseous water vapor from said air process flow,
   (b) a sweep chamber adjacent to said filtration media, and
   (c) a minimum pressure valve in said process flow pathway downstream of said first membrane filter.

19. The apparatus of claim 18 in which said minimum pressure valve opens at a predetermined pressure to provide an exit pathway for said air process flow.

20. The apparatus of claim 18 further comprising:
   (d) a metering device positioned in said process flow pathway and downstream from said filtration media, said metering device adapted to divert a portion of said air process flow as sweep air into said sweep chamber, wherein said sweep air is in flowing fluid communication with said filtration media, and
   (e) a flow restriction mechanism within said flow metering device and adapted to regulate the amount of said sweep air directly proportional to the volume of said air process flow and inversely proportional to the pressure of said air process flow.

21. The apparatus of claim 20 wherein said flow restriction mechanism comprises a variable flow orifice.

22. The apparatus of claim 20 wherein the gaseous water vapor may be separated from said process flow pathway by migration of the gaseous water vapor across said filtration media, from a first side of said filtration media to a second side of said filtration media.

23. The apparatus of claim 22 wherein the gaseous water vapor emerging from sais second side od said filtraion media is carried by said sweep air to the atmosphere.

24. The apparatus of claim 20 in which at least one pre-filtering mechanism is employed upstream of said first membrane filter.

25. The apparatus of claim 24 in which said pre-filtering mechanism comprises a coalescing filter.

26. The apparatus of claim 24 in which said pre-filtering mechanism comprises an activated carbon filter.

27. The apparatus of claim 18 in which at least one pre-filtering mechanism is employed upstream of said first membrane filter.

28. The apparatus of claim 27 in which said pre-filtering mechanism comprises a coalescing filter.

29. The apparatus of claim 27 in which said pre-filtering mechanism comprises an activated carbon filter.

30. An air processing apparatus, comprising:
   (a) a pre-filtering mechanism,
   (b) a filtration media downstream from said pre-filtering mechanism and adapted to receive a process flow of contaminated air along a process flow pathway so as to separate gaseous water vapor from said air process flow,
   (c) a sweep chamber adjacent to said filtration media,
   (d) a metering device in said process flow pathway and downstream from said filtration media, said metering device adapted to divert a portion of said air process flow as sweep air into said sweep chamber, wherein said sweep air is in flowing fluid communication with said filtration media, and
   (e) a flow restriction mechanism within said metering device and adapted to regulate the amount of said sweep air, directly proportional to said air process flow and inversely proportional to the pressure of said air process flow.

31. The apparatus of claim 30 additionally comprising:
   (f) a minimum pressure valve in said process flow pathway downstream of said filtration media, said minimum pressure valve configured to maintain a minimum threshold pressure of said air process flow.

* * * * *